(12) United States Patent
Golly et al.

(10) Patent No.: US 10,024,877 B2
(45) Date of Patent: Jul. 17, 2018

(54) CORROSION-RESISTANT HEATED AIR DATA PROBE METHODS

(71) Applicant: Rosemount Aerospace, Inc., Burnsville, MN (US)

(72) Inventors: Timothy Thomas Golly, Lakeville, MN (US); Matthew P. Anderson, Burnsville, MN (US); Paul Robert Johnson, Prior Lake, MN (US); Greg Seidel, Farmingon, MN (US)

(73) Assignee: Rosemount Aerospace, Inc., Burnsville, MI (US)

( * ) Notice: Subject to any disclaimer, the term of this patent is extended or adjusted under 35 U.S.C. 154(b) by 0 days.

(21) Appl. No.: 15/681,651

(22) Filed: Aug. 21, 2017

(65) Prior Publication Data
US 2017/0343576 A1 Nov. 30, 2017

Related U.S. Application Data

(62) Division of application No. 15/045,907, filed on Feb. 17, 2016, now Pat. No. 9,772,345.

(60) Provisional application No. 62/142,341, filed on Apr. 2, 2015.

(51) Int. Cl.
| | |
|---|---|
| *B23P 17/04* | (2006.01) |
| *G01P 5/165* | (2006.01) |
| *G01F 1/46* | (2006.01) |
| *G01P 1/02* | (2006.01) |
| *G01P 13/02* | (2006.01) |

(52) U.S. Cl.
CPC ............... *G01P 5/165* (2013.01); *G01F 1/46* (2013.01); *G01P 1/026* (2013.01); *G01P 13/025* (2013.01)

(58) Field of Classification Search
CPC ...................................................... B23P 17/04
See application file for complete search history.

(56) References Cited

U.S. PATENT DOCUMENTS

| | | | |
|---|---|---|---|
| 2,399,370 A | 4/1946 | Mcorlly | |
| 2,510,986 A | 6/1950 | Larkin | |
| 4,995,256 A * | 2/1991 | Norlien | ............. G01N 27/4062 |
| | | | 73/31.04 |
| 6,134,972 A | 10/2000 | Streckert et al. | |
| 7,051,604 B1 * | 5/2006 | Mayeaux | ............. G01N 1/2247 |
| | | | 73/863.11 |

(Continued)

FOREIGN PATENT DOCUMENTS

WO 9816837 4/1998

OTHER PUBLICATIONS

Extended European Search Report dated Jul. 19, 2016 in European Application No. 16163691.5.

(Continued)

*Primary Examiner* — Jewel V Dowtin
(74) *Attorney, Agent, or Firm* — Snell & Wilmer L.L.P.

(57) ABSTRACT

A method of making an air data probe may comprise forming a probe body, forming an interior cavity into the probe body, applying a protective shell to the probe body by an additive manufacturing technique, inserting a heating element into the interior cavity, machining a final profile of the air data probe, and forming a sensing port comprising a port passage defined through the probe body and lined by a portion of the protective shell.

3 Claims, 10 Drawing Sheets

(56) References Cited

U.S. PATENT DOCUMENTS

2004/0244477 A1 12/2004 Zippold et al.
2016/0291051 A1 10/2016 Golly

OTHER PUBLICATIONS

USPTO; Restriction Requirement Office Action dated Feb. 16, 2017 in U.S. Appl. No. 15/045,907.
USPTO; Notice of Allowance dated May 22, 2017 in U.S. Appl. No. 15/045,907.

* cited by examiner

CORROSION-RESISTANT HEATED AIR DATA PROBE METHODS

CROSS-REFERENCE TO RELATED APPLICATIONS

This application is a divisional of U.S. patent application Ser. No. 15/045,907, filed on Feb. 17, 2016, and entitled "CORROSION-RESISTANT HEATED AIR DATA PROBE," which claims the benefit of priority of U.S. Provisional Application No. 62/142,341, entitled "CORROSION-RESISTANT HEATED AIR DATA PROBE," filed Apr. 2, 2015, the disclosures of which are hereby incorporated by reference herein in their entirety.

FIELD

The present disclosure relates to the field of data sensing. More particularly, the present disclosure relates to methods for corrosion resistant air data probes.

BACKGROUND

Typical air data probes, such as air data probes used on aircraft operate at a variety of temperatures. For instance, an air data probe such as a pitot-static probe on an aircraft operates at sea-level temperatures as well as at extreme high altitude temperatures, such as about 120 degrees Fahrenheit (about 49 degrees Celsius) in sea-level desert environments to about −70 degrees Fahrenheit (about −57 degrees Celsius) at cruising altitudes. To prevent unwanted freezing and/or ice accumulation on the air data probe, heaters are incorporated into the probe. However, these heaters may cause the air data probe to become very hot when operating in sea-level temperatures, especially during low airflow or still-air conditions. Such heat may accelerate corrosion and wear of the air data probe, especially when exposed to contaminants, such as compounds containing sulfur, chlorine, sulfur dioxide, and/or the like. Prior efforts to address this challenge include manufacturing air data probes from materials that are resistant to high temperature corrosion; however, such materials often exhibit poor thermal conductivity and are susceptible to icing.

SUMMARY OF THE INVENTION

In accordance with various aspects of the present invention, a method of making an air data probe is disclosed. The method may include forming a probe body, forming an interior cavity into the probe body, applying a protective shell to the probe body by an additive manufacturing technique, and inserting a heating element into the interior cavity. The method may further include machining a final profile of the air data probe and forming a sensing port having a port passage defined through the probe body and lined by a portion of the protective shell.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
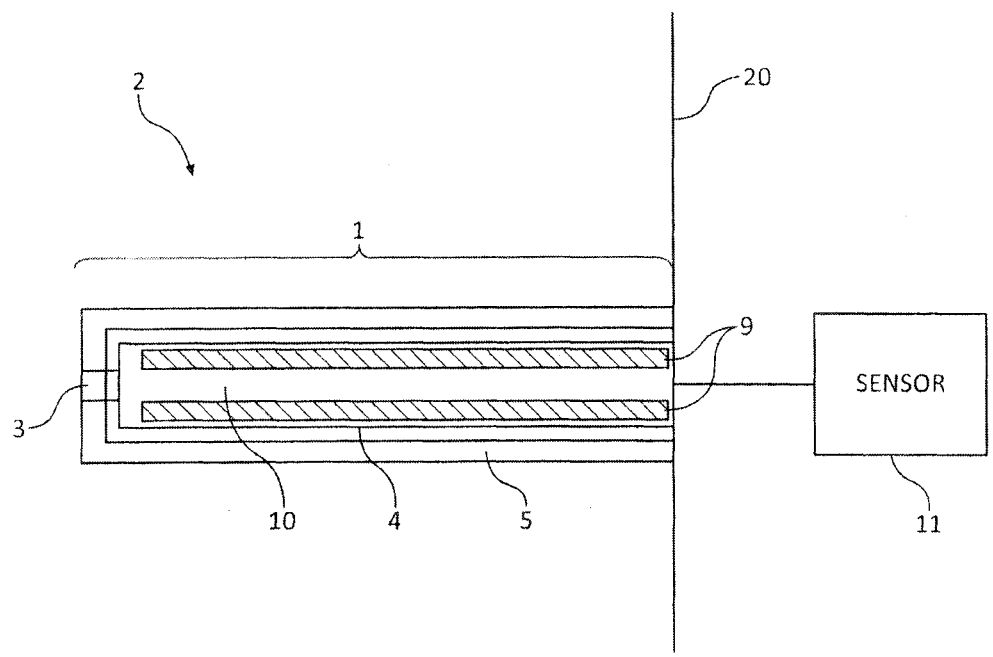
FIG. 1 depicts a block diagram of various aspects of an air data probe, in accordance with various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims. Furthermore, any reference to singular includes plural embodiments, and any reference to more than one component or step may include a singular embodiment or step. Surface shading lines may be used throughout the figures to denote different parts but not necessarily to denote the same or different materials.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction. Also, any reference to attached, fixed, connected or the like may include permanent, removable, temporary, partial, full and/or any other possible attachment option. Additionally, any reference to without contact (or similar phrases) may also include reduced contact or minimal contact.

Aircraft typically utilize air data probes in combination with pressure sensors to sense external air pressures. Both static pressures and dynamic pressures are sensed. For instance, static pressure may be sensed by a pitot-static system to determine pressure altitude, while dynamic pressure may be sensed by an airspeed indication system to determine airspeed. Frequently, additional pressures are measured such that aircraft angle of attack and/or angle of sideslip can also be determined. The air data probe may have sensing ports associated with internal chambers to measure various pressures, such as static pressure and/or to determine angle of attack (AOA). Drain holes may also be associated with internal chambers, such as to drain collected moisture. The external air pressures at the air pressure inlet ports during a variety of flight and ground conditions, such as high temperature, low temperature, high humidity, icing, precipitation, exposure to deicing chemicals and other harsh chemicals, and the like. As such, with reference to FIG. 1, the air data probe 1 may be desired to be heated and be generally thermally conductive, such as to prevent ice accumulation, and yet it also may be desired to provide corrosion resistance and durability at very high temperatures. For instance, the heater may be set at an energy output sufficient to melt ice accumulation at high altitude, low temperature environments, and yet such a setting, or frequently, even a much lower setting, may cause the air data probe 1 to become very hot at low altitude, higher temperature environments, such as on the ground or when there is little or no airflow.

Moreover, materials with resistance to high temperature corrosion resistant materials are often relatively thermally non-conductive and are often alloy materials or other materials that are not readily plated onto more thermally conductive materials, such as to provide corrosion resistant coatings. Accordingly, various systems to address these considerations, among others, are presented herein.

Figure 2:
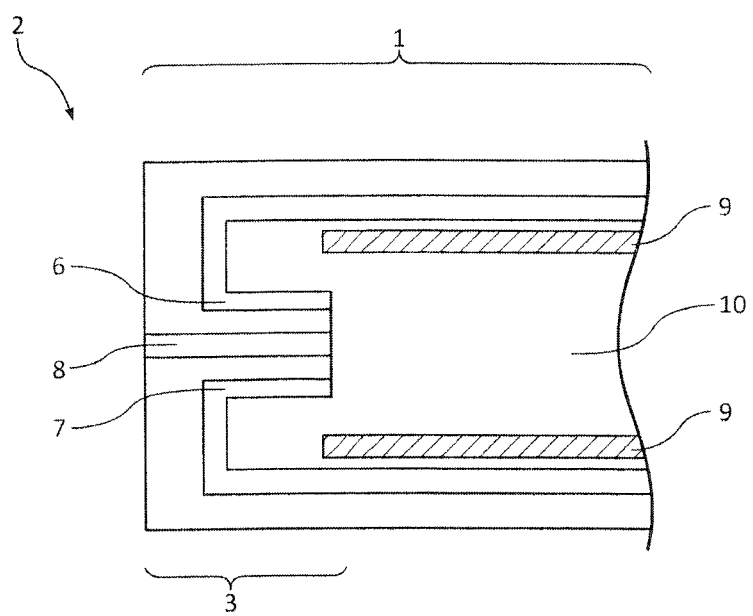
FIG. 2 depicts a block diagram of various aspects of an air data probe, having a sensing port including a sensing port recess, in accordance with various embodiments.

With reference to FIGS. 1-2, an air data probe 1 may operate in an environment 2. An air data probe 1 may comprise a structure extending from a mounting structure 20, such as a strut 21 (FIG. 3) associated with an aircraft, into the environment 2 whereby characteristics of the environment 2 may be sampled. Thus, the air data probe 1 may be in fluidic communication with the environment 2. For example, the air data probe 1 may sample a fluid pressure, such as an air pressure, and such as static pressure for an altitude indicating system, or pitot pressure for an airspeed indicating system.

The environment 2 may comprise a region desired to be tested, such as an area of airflow proximate to a mounting structure 20. In further embodiments, the environment 2 may comprise a test chamber, a furnace, a semiconductor processing vessel, a kiln, and/or any other region wherein characteristics such as pressure may be desired to be sampled.

The air data probe 1 may be connected to a sensor 11. The sensor 11 may be in fluidic communication with an interior cavity 10 of the air data probe 1 whereby a characteristic of the environment 2 being sampled may be determined. For instance, the sensor 11 may comprise an air pressure sensor configured to determine the air pressure sampled by the air data probe 1.

With reference to FIGS. 1-6B, the air data probe 1 may comprise a probe body 4. The probe body 4 may comprise a generally hollow cylindrical member that may extend from the mounting structure 20 (e.g., an aircraft) into the environment 2. The probe body 4 may comprise any mechanism whereby the environment 2 may be sampled and a pressure conveyed into the probe body 4 whereby it is conducted to a sensor 11. The probe body 4 may comprise a vane structure, a flattened cylinder, such as an oval, and/or an airfoil, or any shape as desired. The probe body 4 may comprise a non-cylindrical sensing head probe or a flush static port probe or semi-flush air data probe. In various embodiments, the probe body 4 may be made of a relatively thermally conductive material, such as a metal. The metal may comprise nickel. For instance, the metal may be a nickel alloy such as nickel 211 which is defined according to a corresponding standard set by ASTM International. In various embodiments, the metal comprises a low-alloy and/or commercially pure nickel, such as nickel 200 or nickel 201 which are each defined according to corresponding standards set by ASTM International.

The air data probe 1 may comprise a protective shell 5. A protective shell 5 may comprise a material coating applied over a surface of the probe body 4 and isolating the surface from fluidic communication with the environment 2. For instance, a protective shell 5 may comprise a relatively corrosion resistant material, such as stainless steel, cobalt chrome, or various austenitic nickel-chromium-based alloys. In further embodiments, the protective shell 5 comprises a nickel-chromium alloy, for instance, an austenitic nickel-chromium-based alloy, such as Inconel® available from Special Metals Corporation of New Hartford, N.Y., USA. In various embodiments, the protective shell 5 comprises Inconel® 625, or the like.

Thus, the protective shell 5 provides a coating having desired toughness, hardness, and high temperature corrosion resistance characteristics in addition to exhibiting relatively little galvanic corrosion at the interface of the protective shell 5 and the probe body 4. For example, the probe body 4 may be nickel and the protective shell 5 may comprise a nickel-chromium alloy so that the materials are near/adjacent on the galvanic series chart. In addition, because the protective shell 5 comprises substantially less thermal mass than the probe body 4, the desired thermal conductivity characteristics of the probe body 4 are relatively unhindered. Because the protective shell 5 is relatively thinner than the probe body 4 (e.g., comprises a thermal conduction path toward the ambient environment relatively shorter than that of the probe body 4), the desirable thermal conductivity characteristics of the probe body 4 are further relatively unhindered. Thus, the desired thermal conductivity characteristics of the probe body 4 may be combined with the desired corrosion resistance characteristics of the protective shell 5 in a readily manufacturable (such as by additive manufacturing) air data probe 1. Various manufacturing techniques may be implemented, such as additive manufacturing and/or other manufacturing methods whereby the integrity of the alloy comprising the protective shell 5 may be maintained. Moreover, with specific reference to FIGS. 6A-B, the thickness of the protective shell 5 and/or the probe body 4 may be locally varied. The protective shell 5 may comprise regions of increased/decreased thickness such as a local protective shell thickness variation 15 and the probe body 4 may comprise regions of increased/decreased thickness such as a local probe body thickness variation 16. Thickening local protective shell thickness variations 15 may correspond to thinning local probe body thickness variations 16 so that the overall profile of the air data probe 1 does not vary. In response to a local protective shell thickness variation 15 and/or a local probe body thickness variation 16, heat 13 may be conducted through the probe body 4 and the protective shell 5. In this manner, the distribution of thermal energy may be concentrated or spread as desired. For instance, local variations in the thickness of the protective shell 5 and/or the probe body 4 may be implemented to direct heat from a heating element toward areas particularly susceptible to icing, or to direct heat from a heating element away from the heating element to enhance even distribution of the heat, and/or the like.

With renewed reference to FIGS. 1-2, and 4-6B, an air data probe 1 may comprise an interior cavity 10. With momentary reference to FIGS. 5A-C, an air data probe may comprise multiple interior cavities, such as first interior cavity 10-1, second interior cavity 10-2, third interior cavity 10-3, and fourth interior cavity 10-4. Various interior cavities may be separate by bulkheads, such as first bulkhead 14-1 and second bulkhead 14-2. With returned reference to FIGS. 1-2, and 4-6B, and additional reference to FIG. 5A-C, an interior cavity 10 may comprise a volume defined by the probe body 4 and optionally a bulkhead, such as first bulkhead 14-1 and/or second bulkhead 14-2. In various embodiments, the protective shell 5 extends into the interior cavity 10 and coats a surface of the interior cavity 10. The volume may be configured to provide space to house other components of air data probe 1 and may be configured to be in fluidic communication with both the environment 2 and a sensor 11. In various embodiments, a heating element 9 is disposed within the interior cavity 10. Thus the interior cavity 10 may receive thermal energy from the heating element 9 and may facilitate transference, such as by conduction, convection, and/or radiation, of the thermal energy to the probe body 4 and/or protective shell 5, whereby ice accumulation on the air data probe 1 may be ameliorated.

The air data probe 1 may comprise a heating element 9. The heating element 9 may comprise an electrically heated wire, although the heating element 9 may comprise fluidic passages for the circulation of hot fluid, or may comprise any apparatus whereby the air data probe 1 may be heated. In various embodiments, the protective shell 5 extends into the interior cavity 10 and coats a surface of the heating element 9.

The air data probe 1 may comprise a sensing port 3. The sensing port 3 may provide an aperture defined through the probe body 4 connecting the interior cavity 10 in fluidic with the environment 2. While, with reference to FIGS. 1 and 4, a sensing port 3 may provide an aperture defined through the probe body 4, with reference to FIGS. 2 and 5, a sensing port 3 may comprise further features. For instance, the sensing port 3 may comprise a sensing port recess 6. The sensing port recess 6 may comprise an indentation in the probe body 4. The indentation may comprise a dimple, or a cylindrical groove or a trapezoidal impression, or any shape region of the probe body 4 wherein at least one discontinuity and/or point of inflection in the surface of the probe body 4 is disposed. The sensing port recess 6 may be disposed at an outermost end of the probe body 4 relative to the environment 2 (e.g., the portion farthest from the mounting structure 20 (FIG. 1)). In further embodiments, the sensing port recess 6 is disposed on a side of the probe body 4 (FIG. 3), or at any point on the probe body 4 where the environment 2 is desired to be sampled.

The sensing port 3 may comprise a port protective shell section 7. The port protective shell section 7 may comprise a portion of protective shell 5 having increased thickness (e.g, transverses a greater distance measured along a path normal to a tangent plane of an adjacent surface of the probe body 4 and extending outward therefrom), such as to enclose the sensing port recess 6 and also follow the surface of the probe body 4. In other words, the port protective shell section 7 may comprise a portion of the protective shell covering the indentation comprising the sensing port recess 6 so that the protective shell 5 forms a substantially continuous coating (e.g., the point of inflection removed). Stated yet another way, the indentation may be said to be smoothed.

Moreover, the sensing port 3 may comprise a port passage 8. The port passage 8 may comprise an aperture defined by at least one of the port protective shell section 7 and the probe body 4 and extending through the port protective shell section 7 and the probe body 4 such that the interior cavity 10 is in fluidic communication with the environment 2. In various embodiments, the port passage 8 is aligned coincident with the geometric center of the sensing port recess 6. However, in various embodiments the port passage 8 may have any shape or position as desired. Thus, one may appreciate that at least a portion of the port passage 8 extends through the protective shell 5. Thus, the port protective shell section 7 of the protective shell 5 may line the port passage 8 and ameliorate corrosion of the air data probe 1 proximate to the port passage 8. In various embodiments, the port protective shell section 7 entirely defines the port passage 8, such that the fluid flowing from the environment 2 through the port passage 8 does not contact the probe body 4 while transiting the port passage 8. Stated differently, the port passage 8 may be defined through the probe body 4 and lined by at least a portion of the port protective shell section 7 of the protective shell 5. Thus, in this manner, the corrosion-resistant features of the protective shell 5 may be extended to the port passage 8, thereby ameliorating corrosion along the port passage 8.

Figure 3:
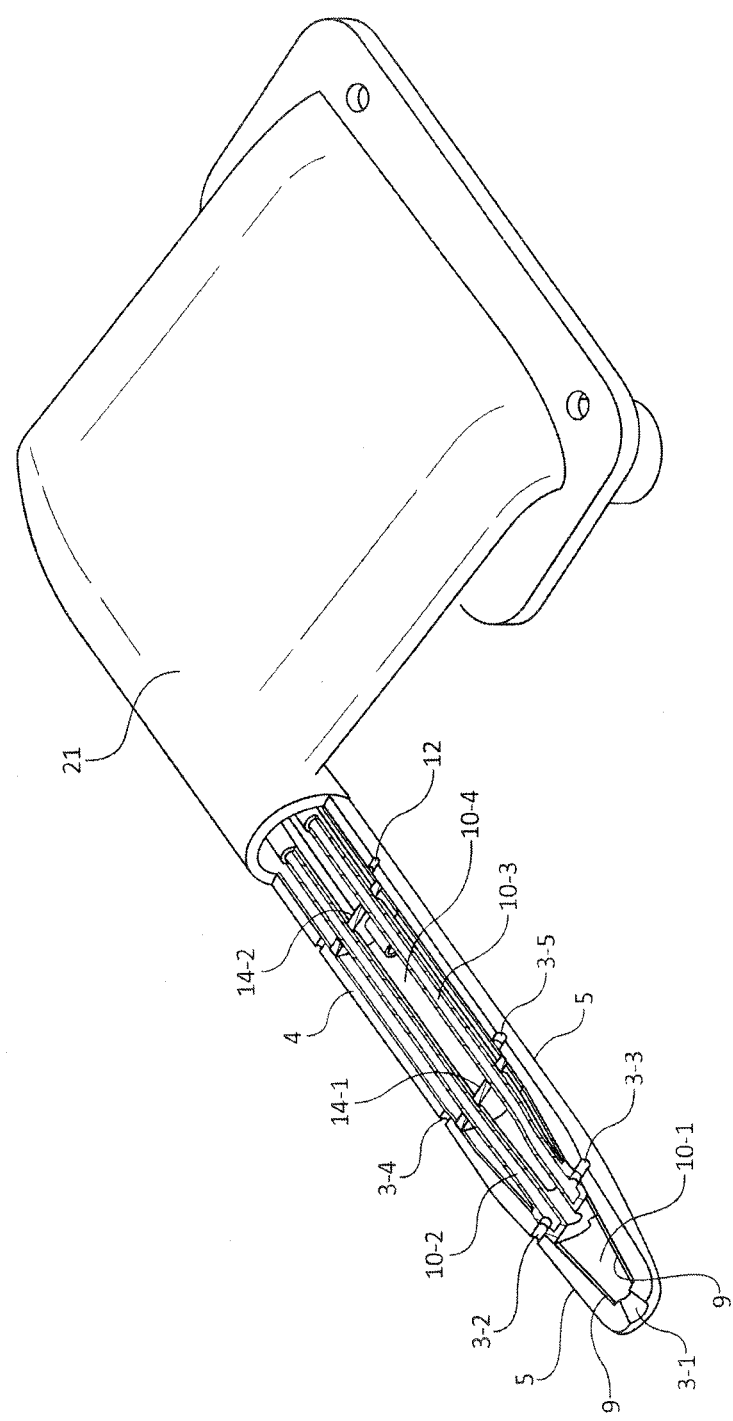
FIG. 3 depicts an exemplary air data probe, in accordance with various embodiments.
Figure 4:
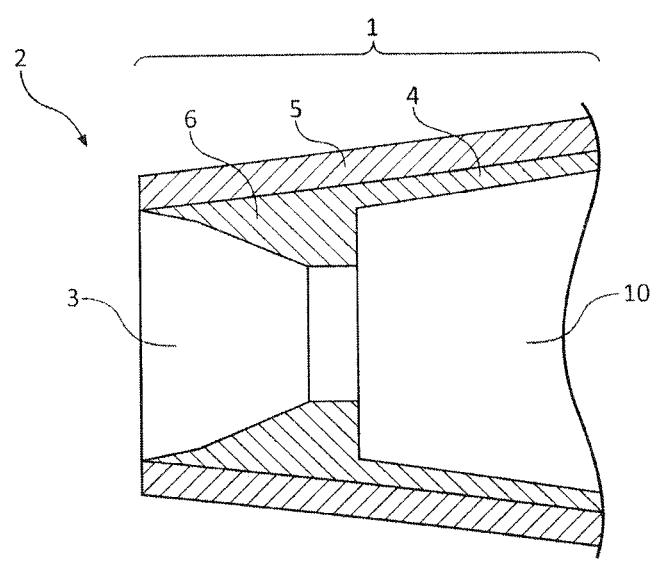
FIG. 4 depicts an exemplary sensing port of an air data probe, in accordance with various embodiments.
Figure 5A:
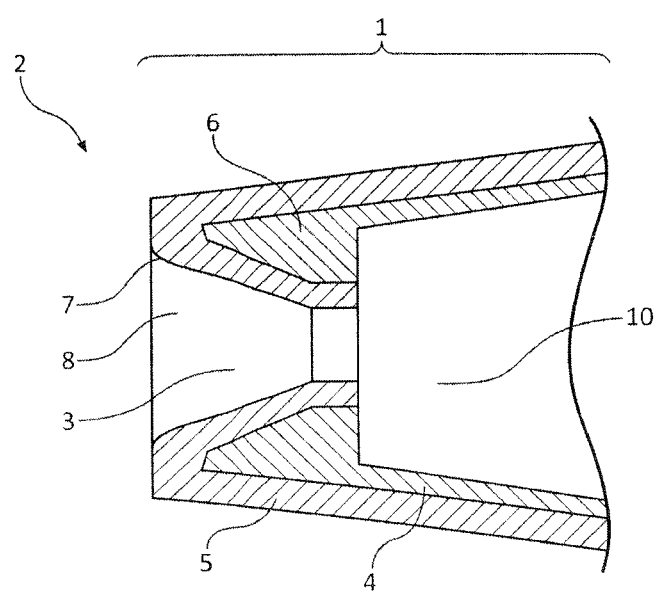
FIG. 5A-C depict exemplary sensing ports of an air data port each including a sensing port recess, in accordance with various embodiments.
Figure 5B:
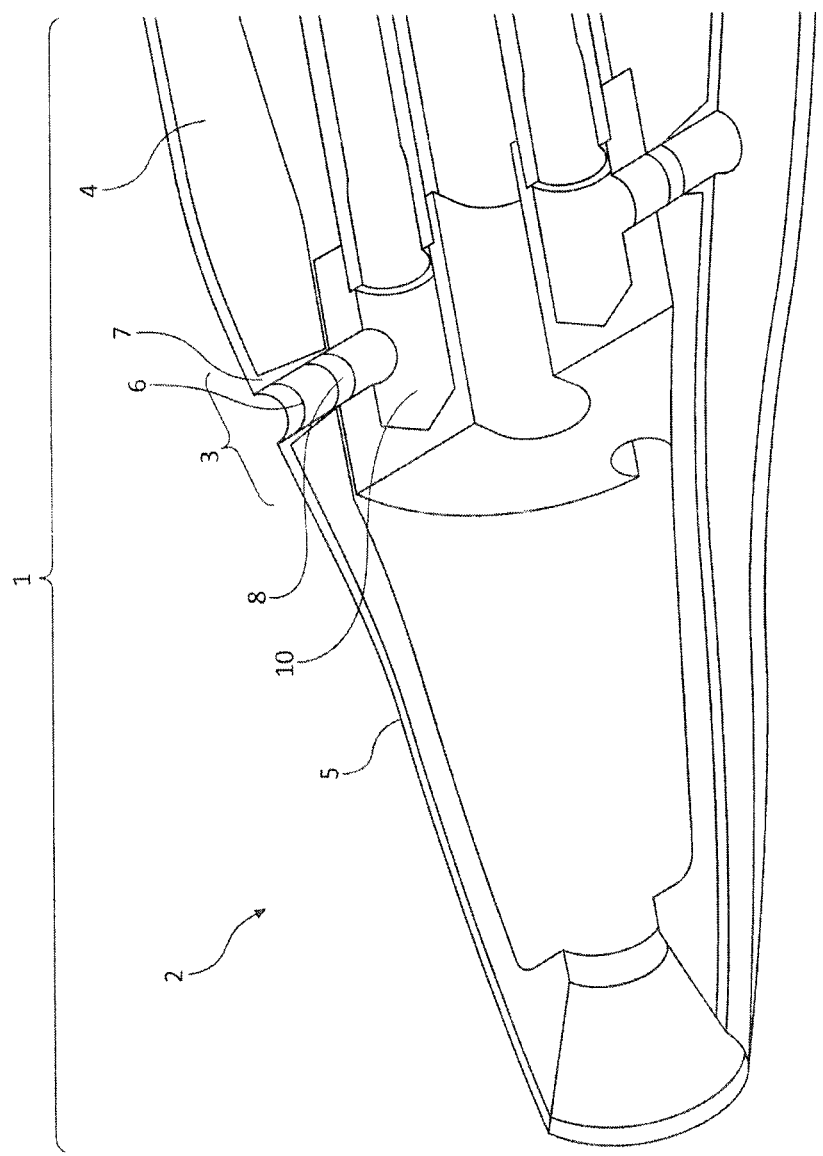
Figure 5C:
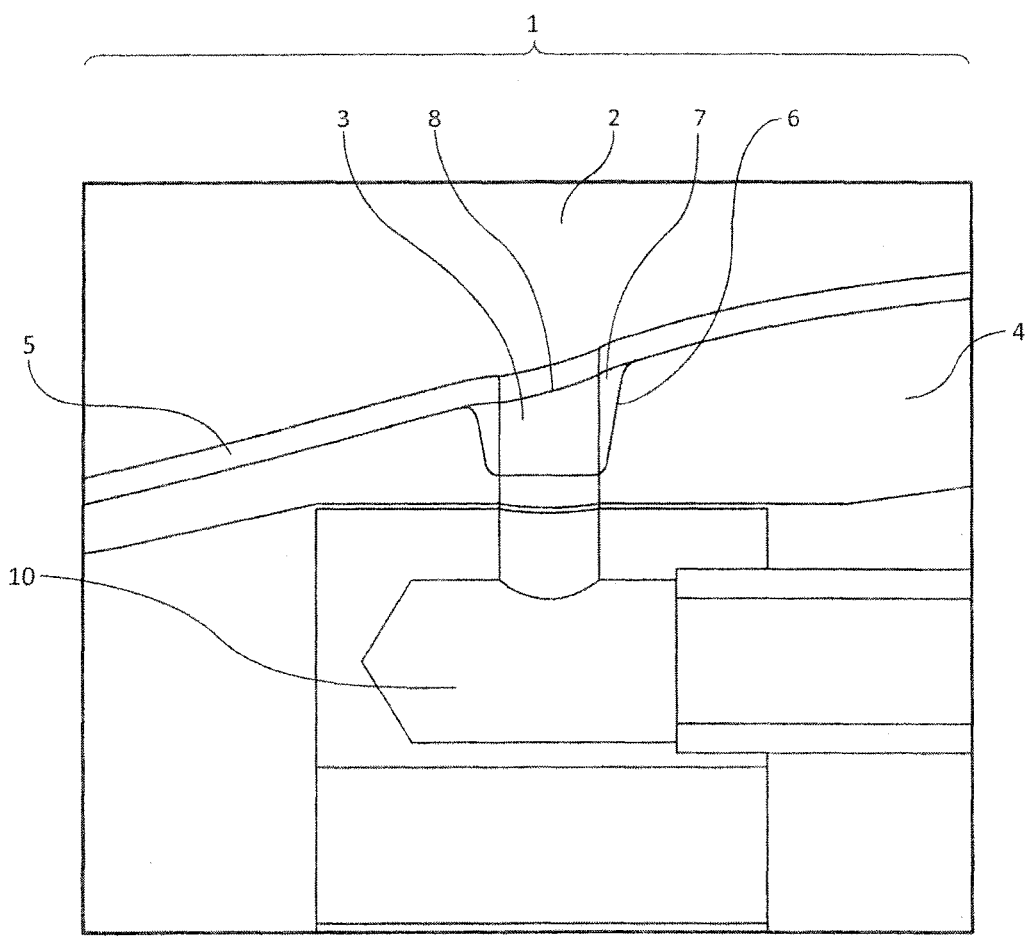
Figure 6A:
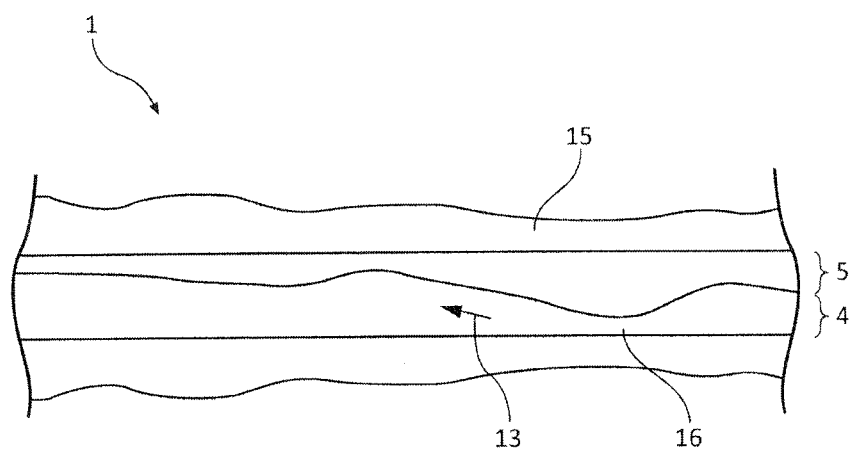
FIG. 6A-B depict an exemplary protective shell of an air data probe and exemplary drain holes of an air data probe, in accordance with various embodiments.
Figure 6B:
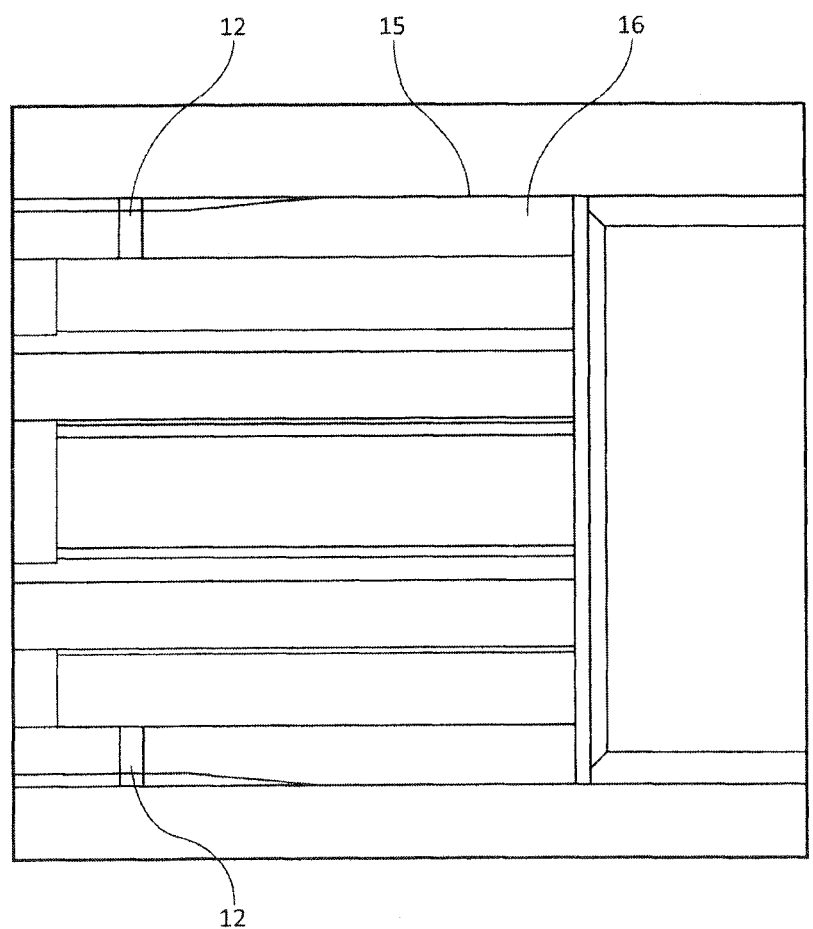
Figure 7:
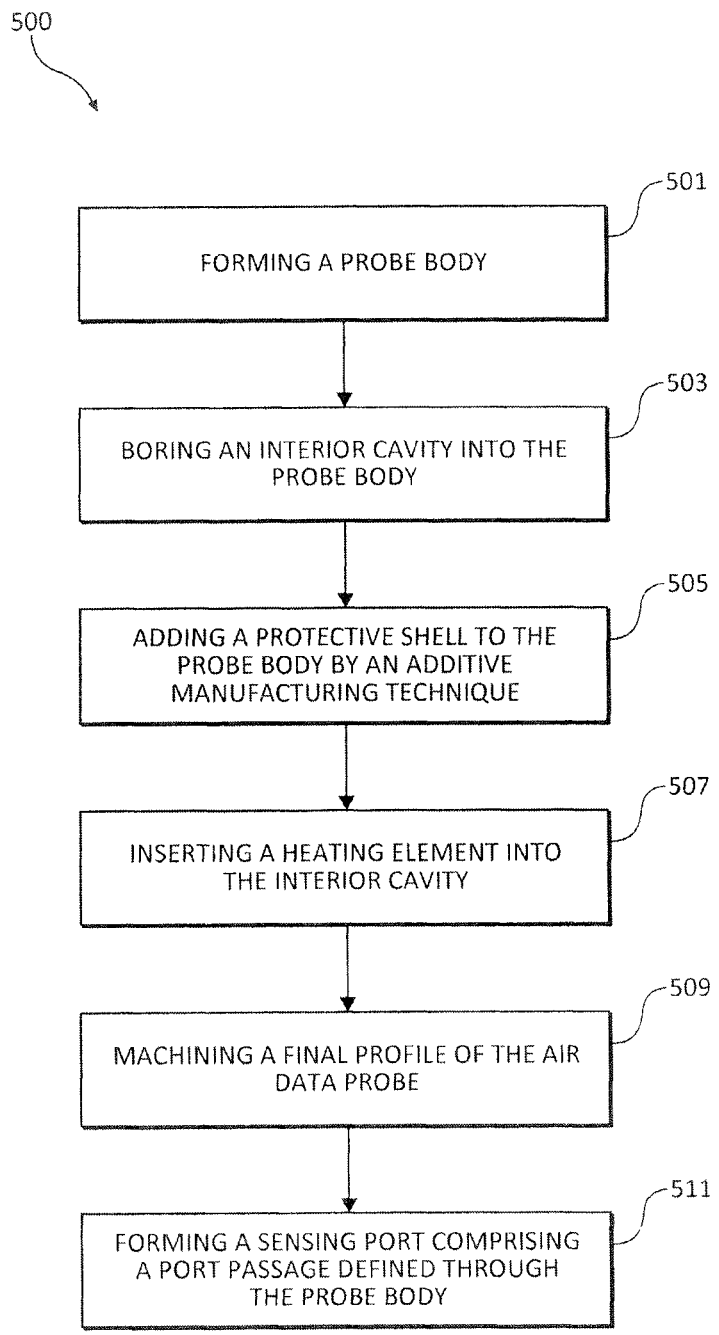
FIG. 7 depicts a method of making an air data probe, in accordance with various embodiments.

With specific reference to FIGS. 3 and 6B, an air data probe 1 may also comprise a drain hole 12. A drain hole 12 may be an aperture defined by through the protective shell 5 and the probe body 4 and permitting accumulated moisture to drain from the air data probe.

Having discussed various aspects of the air data probe 1, attention is directed to FIG. 3 for a discussion of various exemplary embodiments of the air data probe having a plurality of internal cavities 10 and sensing ports 3. For instance, an air data probe may have a first sensing port 3-1. The first sensing port 3-1 may be in fluidic communication with a first internal cavity 10-1. The first sensing port 3-1 may be defined by the probe body and positioned at an outermost end of the probe body and in fluidic communication with an environment. In this manner, the first sensing port 3-1 may receive a dynamic pressure to be sensed by an airspeed indication system to determine airspeed.

The air data probe may have a second sensing port 3-2 and a third sensing port 3-3. The second sensing port 3-2 may be in fluidic communication with a second internal cavity 10-2, and a third sensing port 3-3 may be in fluidic communication with a third internal cavity 10-3. The second sensing port 3-2 and the third sensing port 3-3 may be disposed on radially opposing tapering sides of the air data probe 1. In this manner, the second sensing port 3-2 and the third sensing port 3-3 may receive both common-mode and differential pressure components to be sensed by an angle of attack indication system to determine an angle of attack (AOA) relative to all airstream.

Finally, the air data probe may have a fourth sensing port 3-4 and a fifth sensing port 3-5. The fourth sensing port 3-4 and the fifth sensing port 3-5 may be in fluidic communication with a fourth internal cavity 10-4. The fourth sensing port 3-4 and the fifth sensing port 3-5 may each may be disposed on sides of the air data probe 1. In this manner, the fourth sensing port 3-4 and the fifth sensing port 3-5 may both receive a static pressure to be sensed by an altitude indication system to determine a pressure altitude.

Bulkheads may be disposed in the air data probe 1 to isolate internal cavities from one another and from other air data probe 1 features, such as drain holes 12. For instance, a first bulkhead 14-1 may isolate the first internal cavity 10-1 and the fourth internal cavity 10-4. A second bulkhead 14-2 may seal the fourth internal cavity 10-4 such as to prevent fluidic communication with drain holes 12.

Each of the sensing ports 3-1, 3-2, 3-3, 3-4, and 3-5 may comprise the various features discussed herein, such as to ameliorate icing and/or freezing and yet to further ameliorate corrosion.

Having discussed various aspects of the air data probe 1, various methods of making the air data probe 1 are provided. With reference to FIGS. 1-6B and FIG. 7, a method 500 of making the air data probe 1 may comprise forming a probe body 4 (Step 501). The probe body 4 may be formed undersized relative to the desired final size of the air data probe 1, such as to allow for the thickness of the protective shell 5 to be added subsequently. In various embodiments the interior cavity 10 is formed, such as by boring and/or as a contemporaneous portion of the forming of step 501 (Step 503). The interior cavity 10 may be bored to a final size, or in further embodiments, may be bored undersize, such as to permit later finishing, or may be bored oversized, such as to allow for the thickness of a protective shell 5 to be added to the interior cavity 10 later. The protective shell 5 may be added to the probe body 4 (Step 505). In various embodiments, the protective shell 5 is additionally added to at least one of the interior cavity 10 and the heating element 9. Air data probe 1 components may be inserted into the interior cavity 10 (such as a heating element 9, bulkheads, pressure lines, etc.) and in various embodiments, vacuum brazed or otherwise fastened in place (Step 507). At this point, various high temperature processing steps tending to cause warping of the air data probe 1 have been completed. Thus the final profile of the air data probe 1 may be machined (Step 509). The sensing port 3 may be formed (Step 511). For instance, a port passage 8 may be bored as well as any other apertures in the air data probe 1, such as drain holes, static ports and the like. The port passage 8 may be defined through the probe body 4 and lined by at least a portion of the port protective shell section 7 of the protective shell 5. Thus, an air data probe 1 may be manufactured having the dimensions of a standard air data probe, but further having enhanced corrosion resistance features. In various embodiments at least some of these steps may be performed in simultaneity and/or the order of steps may be changed. For example, step 507 may be performed earlier in time than step 505.

In various embodiments, the protective shell 5 is added to at least one of the probe body 4, the interior cavity 10 and the heating element 9 by an additive manufacturing technique. For instance, the protective shell 5 may be added by laser cladding. In further embodiments, the protective shell 5 may be added by plasma spraying, for instance, cold spraying (e.g., gas dynamic cold spraying).

In various embodiments, the air data probe 1 may comprise multiple materials, or any material configuration suitable to enhance or reinforce the resiliency and/or support of the system when subjected to wear in an aircraft operating environment or to satisfy other desired electromagnetic, chemical, physical, or material properties, for example weight, heat tolerance, thermal conductivity, radar signature, ferromagnetic properties, ductility, strength, durability, and other properties.

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or propulsion systems, or any other system or process having need for pressure sensing in extreme temperature environments and/or humid environments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of making an air data probe comprising:
   forming a probe body;
   forming an interior cavity into the probe body;
   applying a protective shell to the probe body by an additive manufacturing technique;
   inserting a heating element into the interior cavity;
   machining a final profile of the air data probe; and
   forming a sensing port comprising a port passage defined through the probe body and lined by a portion of the protective shell.

2. The method according to claim 1, wherein forming the sensing port further comprises:
   forming a sensing port recess comprising an indentation formed in the probe body; and
   applying the portion of the protective shell disposed over the sensing port recess and forming a substantially continuous surface over the indentation,
   wherein the port passage comprises an aperture defined by the portion of the protective shell and in fluidic communication with an environment and the interior cavity.

3. The method according to claim 2, wherein the port passage is aligned coincident with a geometric center of the sensing port recess.

\* \* \* \* \*